Jan. 17, 1956   J. L. HEROLD ET AL   2,731,128
AUTOMATIC FEED CONVEYORS
Filed Oct. 4, 1951   3 Sheets-Sheet 1
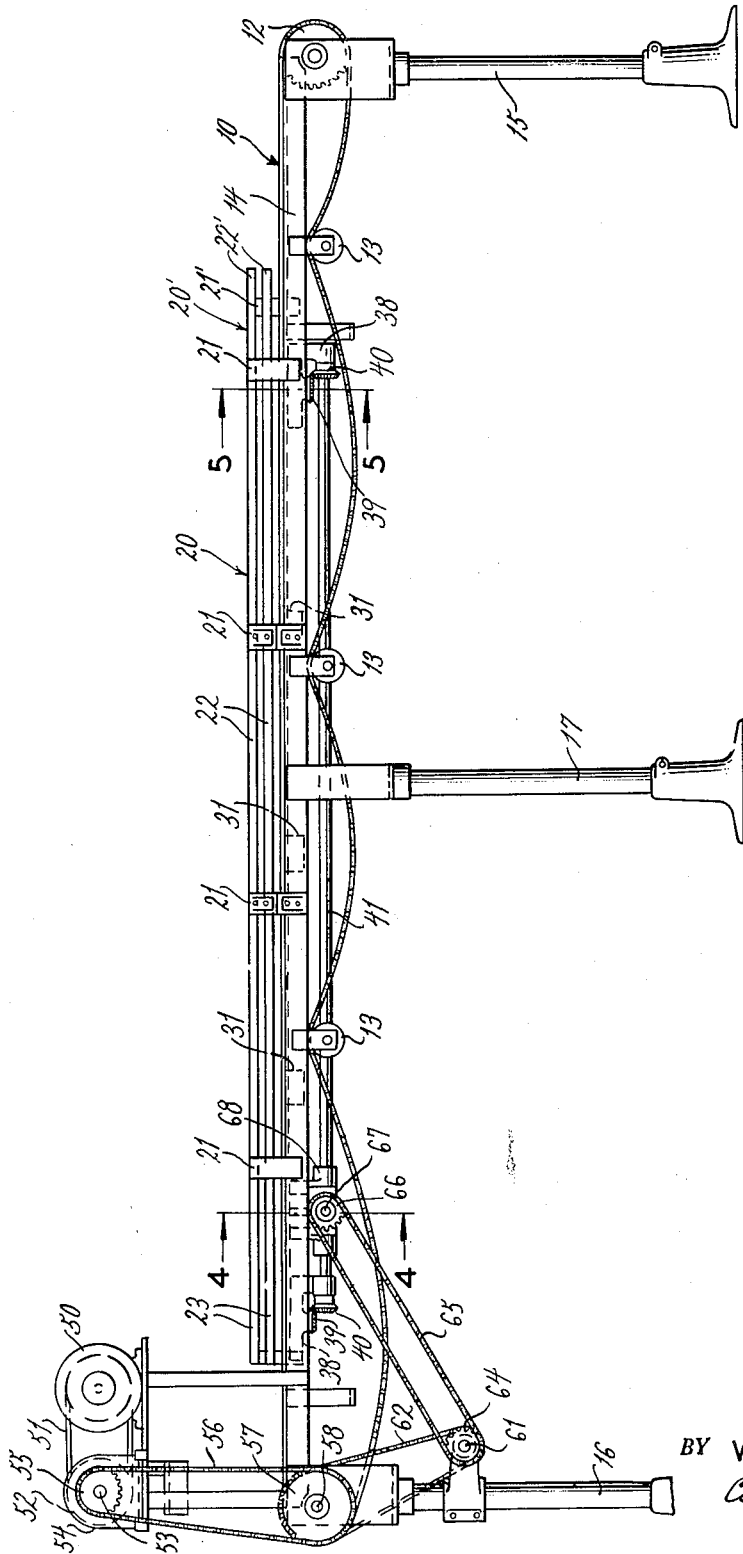
FIG. I.
INVENTORS
JAMES L. HEROLD
BY WILLIAM J. NEKOLA
Carr & Carr & Gravely
ATTORNEYS

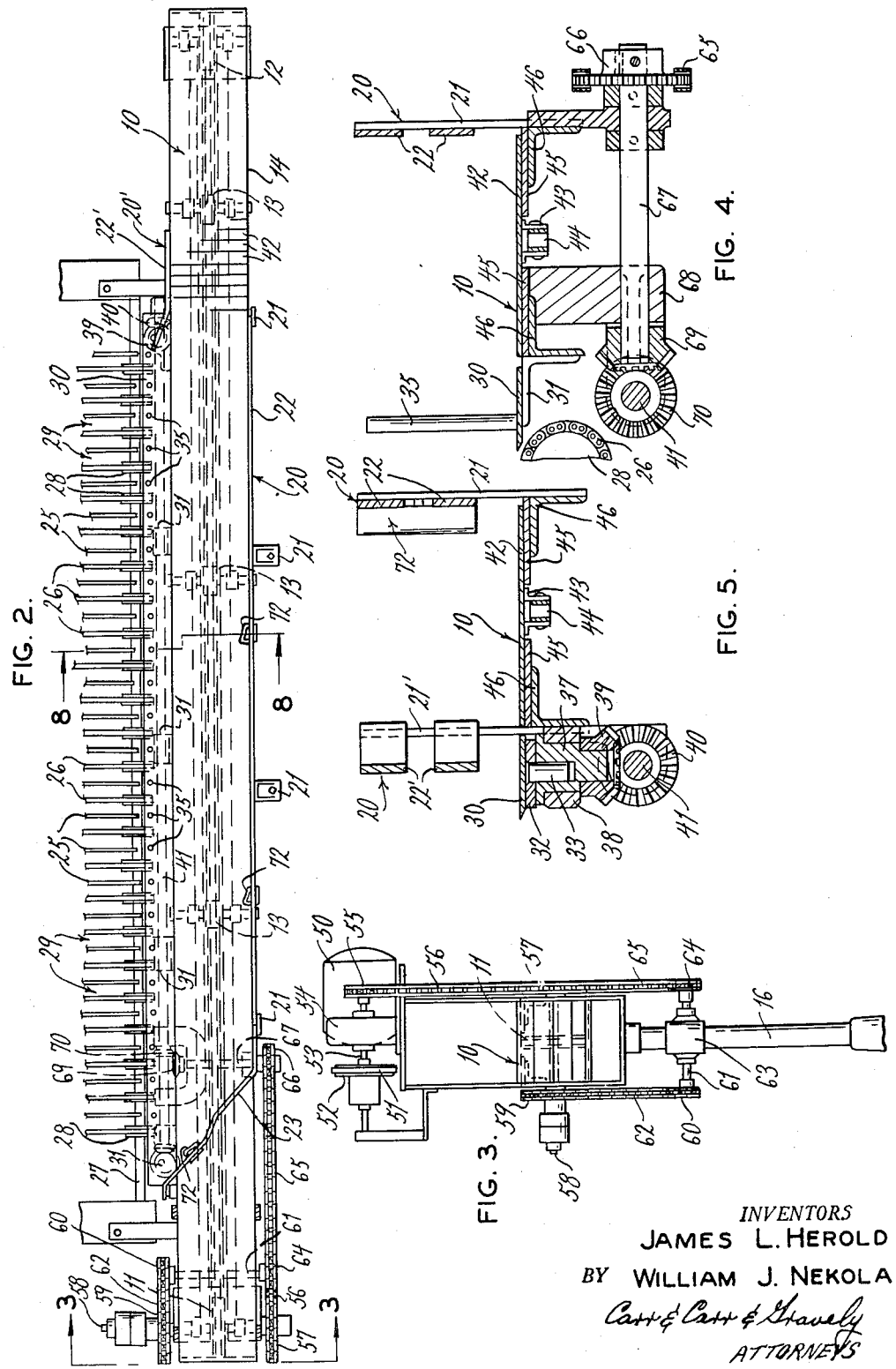

Jan. 17, 1956  J. L. HEROLD ET AL  2,731,128
AUTOMATIC FEED CONVEYORS
Filed Oct. 4, 1951  3 Sheets-Sheet 3

INVENTORS
JAMES L. HEROLD
BY WILLIAM J. NEKOLA
Carr & Carr & Gravely
ATTORNEYS

United States Patent Office 2,731,128
Patented Jan. 17, 1956

2,731,128
AUTOMATIC FEED CONVEYORS

James L. Herold, St. Louis, and William J. Nekola, Normandy, Mo., assignors to Barry-Wehmiller Machinery Company, St. Louis, Mo., a corporation of Missouri Application October 4, 1951, Serial No. 250,124

7 Claims. (Cl. 198—30)

This invention relates to automatic feed conveyors and is particularly concerned with automatic conveyors for feeding containers from a large group into one or more lanes or aisles where the containers will then continue on for further handling.

An important object of the present invention is to provide conveyor mechanism for receiving and accumulating a large group of containers or similar articles in a haphazard order and for conveying such containers in an orderly manner into one or more conveyor lanes or aisles.

An object hereof is to accomplish the conveying of the large group of haphazardly received and accumulated containers into conveyor lanes or aisles without damage or injury to the containers.

An object hereof is to provide an automatic feed conveyor for handling different sizes of the containers.

A further object is to provide means in connection with conveying mechanism for agitating, stirring or dislodging stagnate or trapped groups of containers, whereby to maintain a free and substantially continuous flow of such containers into the conveyor lanes or aisles, and for keeping the lanes or aisles substantially loaded.

The present invention, in what is now regarded as a preferred construction, comprises a continually operating conveyor for receiving a haphazard and large group of containers and to convey the containers into an accumulating and distribution zone, loading and agitating means located in the distribution zone for causing the accumulation of containers to seek a semblance of orderly movement, and means defining conveyor lanes or aisles into which the containers are moved so that the containers flow out of the distribution zone in approximate balance with other containers flowing into said zone.

The present invention also consists in the parts, mechanisms and operating members, and in the combination of such parts and mechanisms as will be hereinafter referred to and described in connection with the accompanying drawings, herein:

Fig. 1 is a longitudinal elevational view of the automatic feed conveyor embodying a presently preferred construction of the invention;

Fig. 2 is a top planned view of the automatic feed conveyor showing further details of the assembly;

Fig. 3 is an end elevational view taken at line 3—3 of Fig. 2;

Fig. 4 is an enlarged fragmentary transverse sectional view taken at line 4—4 of Fig. 1;

Fig. 5 is also a fragment transverse sectional view at line 5—5 of Fig. 1;

Figure 6:
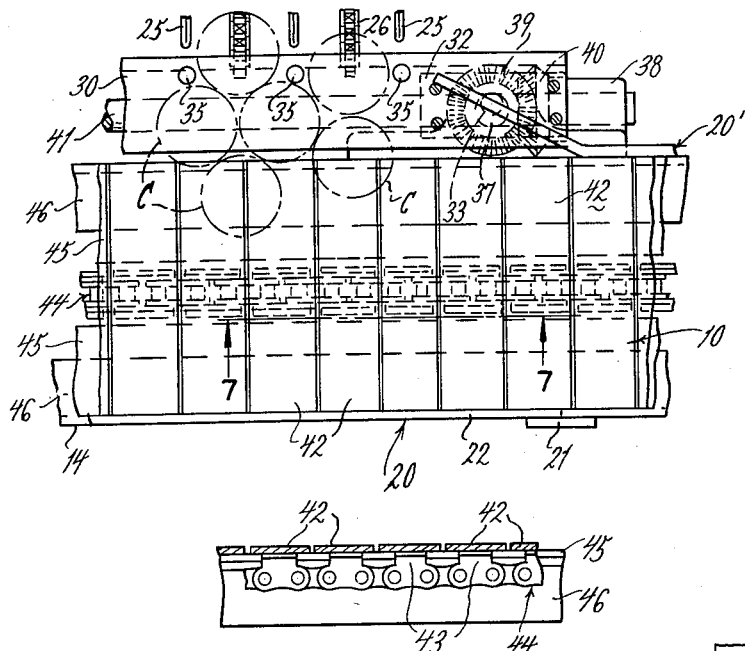
Fig. 6 is an enlarged fragmentary plan view of the conveyor assembly.
Figure 7:
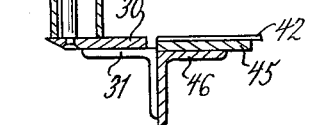
Fig. 7 is a fragmentary sectional elevation, at line 7—7 in Fig. 6.

Referring to Figs. 1 and 2, the automatic feed conveyor includes a continuous or endless conveyor belt 10 operated by a driven pulley 11 at one end and an idler pulley 12 at the opposite end together with a plurality of support pulleys 13 for carrying the returning portion of the conveyor belt 10. The belt 10 and the several pulleys above mentioned are suitably operated on a longitudinal frame assembly 14 which is carried on end pedestals 15 and 16 and one or more intermediate pedestals 17.

The conveyor belt 10 has an elongated horizontal section which moves past a stationary fence 20 suitably carried by the frame 14 on a plurality of vertically directed fence posts or brackets 21. The fence consists in a number of continuous horizontally directed rails 22 having a laterally directed rail portion 23 at one end which reaches across the face of the conveyor belt 10 at an angle. The fence 20 together with the conveyor belt 10 running adjacent thereto define a container distribution zone. It is the purpose of the fence 20 to accumulate the containers within the distribution zone and to prevent containers moving beyond the angularly directed fence portion 23. At the entrance of the distribution zone there is provided an auxiliary guide fence 20' consisting of rails 22' carried by a post or bracket 21'. The auxiliary fence 21' is located on the opposite side of the conveyor belt 10 from the first described fence 20.

The present example shows the conveyor 10 moving into the accumulating zone from the right side. It is understood that the direction of conveyor movement is optional. Furthermore, the lanes or aisles, later described, may be arranged at either side of the conveyor 10 and at any convenient or desired angle, or parallel to the conveyor 10.

The above described container accumulating and distribution zone of the conveyor assembly, as defined by the fences 20 and 20' has a longitudinally extending open side (Fig. 2) through which open side the containers are discharged or moved into one or more conveyor lanes or aisles. The structure defining the several conveyor lanes is shown in fragmentary detail in Figs. 2, 6 and 8. This structure consists of a plurality of partition elements 25 which are vertically positioned and spaced along the open side of the distribution zone of the conveyor belt 10. Between the several partitions 25 are located a series of identical chain type conveyor belts 26. All of the conveyor belts 26 are operated from a shaft 27, the shaft carrying a series of similar belt sprockets 28, equal in number to the number of conveyor belts 26. The partitions define lanes or aisles 29 over the several belts 26.

The present automatic feed conveyor further includes means for stirring and agitating the containers C (Fig. 6) in the distribution zone, as they approach the entrance to the lanes 29, so that the containers will not be trapped or jammed into an immovable mass by the pressure or crowding effect raised by the continuous arrival of additional containers on the conveyor belt 10. It should be noted here that the fence 20, and particularly its angularly directed end portion 23, prevents the containers from moving beyond the distribution zone. Hence the containers in the distribution zone are continuously sliding on the surface of the conveyor belt 10. This sliding action creates the frictional force which results in the containers tending to jam or crowd up in a tight mass.

Figure 8:
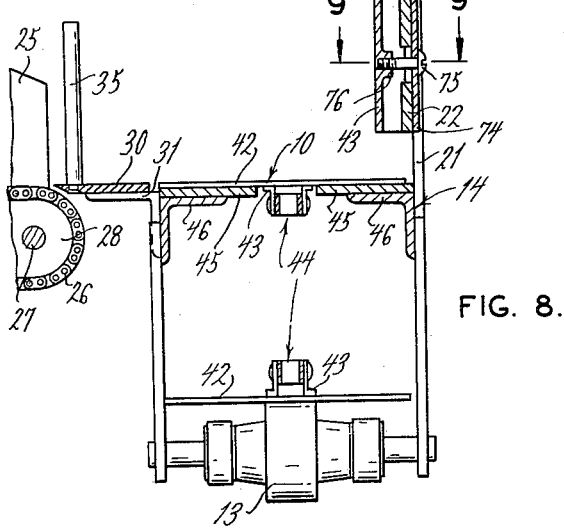
Fig. 8 is an enlarged fragmentary transverse sectional view at line 8—8 in Fig. 2.

The loading and agitating means for preventing the jam-up of the containers includes an elongated plate member 30 (Figs. 2, 4, 5, 6 and 8) which extends substantially the full length of the open side of the distribution zone in a parallel and spaced relation with the conveyor belt 10. The loading member 30 is carried on angle support brackets 31 intermediate its ends and, as shown in Figs. 4, 5 and 8, is positioned with its upper face in the plane of the conveyor 10. The member 30 also is carried adjacent its ends on oscillating plates 32 which, in turn, are attached to eccentric pins 33. Each of the oscillating plates 32 and eccentric pins 33 are similarly formed so that the loading means 30 move in a uniform manner over its full length. The plate 30 carries a plurality of upstanding stirring elements 35, each element 35 being normally located adjacent the end of a partition element 25, at one side of the longitudinal axis of the conveyor lanes 29. All of the stirring elements 35 move in unison and the orbit of movement is determined by the eccentricity of the pins 33.

Each of the eccentric pins 33 (Figs. 2, 5, and 6) is carried in a suitable socket formed eccentrically in the drive shaft 37 set in the bearing 38 and driven through a beveled gear 39 by means of the meshing beveled gear 40 on the shaft 41. The construction of the parts 37, 38 and 39 is identical for each end of the agitating plate 30.

The conveyor belt 10, in Figs. 4 and 6, is formed to include a series of flights or plates 42 each individually connected by a bracket 43 to the links of a conveyor chain 44. The several flights or plates 42 for the conveyor are slidably carried on longitudinally directed bars 45 (Figs. 4 and 5) carried by suitable brackets 46 forming a part of the frame 14.

The means for supplying the motive power to the conveyor mechanism is shown in connection with Figs. 1, 2 and 3. A drive motor 50 is provided with a speed controlling sheave 51 belt connected to the companion variable sheave unit 52. The shaft 53 of unit 52 is part of the speed reduction unit 54. The drive sprocket 55 of the unit 54 is connected by chain 56 to sprocket 57 on shaft 58. Shaft 58 carries the conveyor belt pulley 11. At one end of shaft 58 a sprocket wheel 59 is disposed in alignment with a sprocket 60 carried on an intermediate shaft 61. A belt 62 connects sprockets 59 and 60. Shaft 61 is revolvable in a bearing bracket 63 on the support pedestal 16. The opposite end of intermediate shaft 61 is provided with a sprocket 64 which is connected by a sprocket chain 65 with the sprocket wheel 66 on a shaft 67 located just beneath the conveyor belt 10, as in Figs. 1, 2 and 4. Shaft 67 is carried in a bearing frame 68 of the conveyor frame 14 and has a beveled gear 69 which meshes with a bevel gear 70 carried on the longitudinally directed shaft 41. Shaft 41 extends the length of the loading and agitating plate 30 and operates to drive the eccentric shaft members 37 for activating the eccentric pins 33 and the plate 30.

Figure 9:
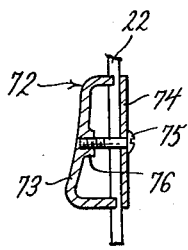
Fig. 9 is a sectional detailed view of a deflector means, as seen at line 9—9 in Fig. 8.

In addition to the agitating effect of the eccentrically driven loading means 30 with the stirring element 35 thereon, the continuously arriving haphazard mass of containers moved by the conveyor belt 10 is caused to be moved toward the end zone of the lanes or aisles 29 by deflector means 72 shown in Figs. 2, 8 and 9 in particular. Each deflector comprises a face plate 73 having inwardly directed legs of a different length to impart a desired pitch to the plate 73 for causing containers coming into contact with the deflector to move laterally away with an abrupt motion into the stream of the containers. The deflector 72 is conveniently attached to and located lengthwise of the fence 20 by a backing plate 74 in combination with a threaded element 75 reaching through the fence 20 to have threaded engagement with the boss 76 behind the face plate 73. Any number of these deflector means 72 may be disposed along the fence 20; and in Fig. 2, three are disclosed.

The present automatic feed conveyor is designed to bring into the distribution zone a group of containers, such as bottles or the like, in a haphazard and crowded condition. The continuous crowding of the containers against the guide fence 20 causes them to be abruptly deflected by the deflector means 72 across the general direction of flow of the containers. Thus, the continuously arriving containers cause the containers already collected in the distribution zone to move toward the open side of the distribution zone with the assistance of deflectors 72 and the angled portion 23 of the fence 20. When the containers have obtained this position, the fingers 35 together with the contact of the containers on the plate 30 continuously agitate, stir or dislocate the crowded or jammed groups of containers, so that the containers are brought into an orderly outflowing stream along each of the lanes 29. As soon as a container has been displaced into a lane 29 between adjacent partitions 25, the conveyor means 26 for that lane will immediately cause the container to move forward into the lane.

The present conveyor operates to maintain the lanes filled with containers so that the further processing of the containers occurs with a full or complete complement of containers. Practically then, the capacity of the processing equipment or means beyond the lanes will determine the discharge capacity or rate of the conveyor assembly ahead of the lanes, and the capacity can be related to conveyor feed speed so that damage to the containers or overloading of the conveyor is avoided. It has been calculated that the conveyor feed speed is equal to the number of containers per unit time received beyond the lanes multiplied by an area factor, a container area factor and a slippage factor. The area factor is obtained by dividing the square inches in one square foot by the width in inches of the conveyor surface (width of flights 42). The container area factor is obtained by dividing the number of containers which can be placed in one square foot of area into unity. The slippage factor is a constant, based upon the slippage friction forces between the bottom face of the container and the face of the conveyor flights 42 modified by the presence of lubricant, dirt or other condition obtaining. The slippage factor is taken as 2.5, but may be found to vary for different machines, or for certain conditions not ordinarily considered.

Figure 11:
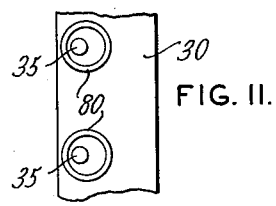
Fig. 11 is a view at line 11—11 in Fig. 10.
Figure 10:
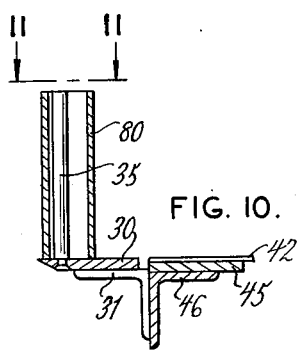
Fig. 10 is a fragmentary elevational view showing a modification hereof.

The modification shown in Figs. 10 and 11 consists in applying a removable stirring nipple or sleeve 80 to the stirring fingers 35 carried by the plate 30. Each sleeve 80 is preferably loosely disposed over a finger 35 so that it may have an orbit of motion different from the finger in order to have a desired stirring effect on containers. The principal purpose of the sleeve 80 is to enlarge the finger 35 for each change in diameter of containers handled, thereby adapting the conveyor to variations in the size of the containers and width of the lane or aisle 29.

Accordingly, the present automatic feeding conveyor attains the important object of maintaining the lanes or aisles substantially loaded through the crowding effect of the containers brought to the distribution zone on the conveyor belt 10, the deflecting action of means 72 and angled fence portion 23, and through the agitating action of plate 30 with the stirring fingers 35 thereon.

What we claim is:

1. In container conveying apparatus, spaced horizontally directed conveyors, one of said conveyors being adapted to move containers in a haphazard crowd to a discharge zone and others of said conveyors being adapted to move containers out of the discharge zone in an orderly flow, and container agitating and transferring means disposed at the discharge zone and in the space between said conveyors, said means including a plate member having a container supporting surface substantially level with said conveyors and projections on said supporting surface engaging the containers, said plate member and projections being adapted to move relative to said conveyors in directions longitudinally and transversely of the space between said conveyors to agitate the container crowd and transfer the containers to said other conveyors in an orderly flow.

2. In container conveying apparatus, a horizontally directed supply conveyor adapted to move containers in a haphazard crowd to a discharge zone, receiving conveyor means spaced from said supply conveyor to move containers out of the discharge zone in an orderly flow, and container agitating and transferring means disposed at the discharge zone in position to bridge the space between said conveyors, said last means including a member having a flat surface substantially level with said supply conveyor and upstanding container stirring elements carried by said member at its flat surface, said member being movable horizontally in the space between said conveyors to transfer the containers and said elements agitating the containers in the haphazard crowd.

3. In container conveying apparatus, a first horizontally movable supply conveyor conducting containers in a haphazard crowd to a discharge zone, conveyor means spaced from said first conveyor at the discharge zone and directed horizontally away from said first conveyor, container transferring means disposed in the space between said first conveyor and conveyor means, said transferring means including a movable member having a container supporting surface and container engaging elements extending upwardly from said surface to move about among the containers, and means connected to said member to move the latter in horizontal directions between and relative to said first conveyor and conveyor means.

4. In container conveying apparatus, a first horizontally movable supply conveyor conducting containers in a haphazard crowd to a discharge zone, fixed means adjacent said supply conveyor defining the discharge zone and adapted to collect the containers in such zone, conveyor means spaced from said first conveyor at the discharge zone and directed horizontally away from said first conveyor, container transferring means disposed in the space between said first conveyor and conveyor means, said transferring means including a movable member having a container supporting surface and container engaging elements extending upwardly from said surface to move about among the containers, and means connected to said member to move the latter in horizontal directions between and relative to said first conveyor and conveyor means.

5. In container conveying apparatus, a first horizontally directed supply conveyor moving containers in a haphazard crowd to a discharge zone, stationary means adjacent said first conveyor defining the discharge zone and adapted to urge the containers off said first conveyor in a direction laterally of the direction of conveyor movement, conveyor means spaced from said first conveyor at the discharge zone to receive the laterally discharged containers, and container transferring means including a horizontally directed member having a surface substantially level with said first conveyor and spaced stirring rods fixed on said member, said member being located at said discharge zone and adapted to move alternately toward and away from said first conveyor and conveyor means, said moving member supporting the containers and said stirring rods moving about in the haphazard crowd of containers to effect an orderly flow to said conveyor means.

6. Conveying apparatus including a first conveyor for moving a crowd of containers, stationary means adjacent said first conveyor for accumulating the containers in a crowd, a second conveyor adjacent the first conveyor for receiving the containers from the accumulated crowd, container transfer means between said conveyors in position to support the containers during transfer, container stirring elements on said transfer means projecting into the path of transfer of containers, and spaced rotating means for said transfer means, including a common drive assembly for said rotating means and an eccentric pin connecting each of said rotating means with said common drive assembly to determine the magnitude of the orbit thereof, whereby said stirring elements are caused to follow the eccentric orbit and engage containers in the crowd to assist in the transfer thereof.

7. Conveying apparatus including a first conveyor for moving a crowd of containers, stationary means adjacent said first conveyor for accumulating the containers in a crowd, a second conveyor adjacent the first conveyor for receiving the containers from the accumulated crowd, container loading means between said conveyors, container stirring elements on said loading means for moving adjacent containers in the crowd to break up jams from the pressure of containers more remotely located in the accumulated crowd, and a sleeve removably carried by each of said stirring elements for altering the spacing between said elements to accommodate containers of different sizes.

References Cited in the file of this patent

UNITED STATES PATENTS

| | | |
|---|---|---|
| 791,243 | Carlson | May 30, 1905 |
| 2,183,433 | Rheinstrom | Dec. 12, 1939 |
| 2,333,576 | Kerr | Nov. 2, 1943 |
| 2,380,910 | Newton | July 31, 1945 |
| 2,437,214 | Tremblay | Mar. 2, 1948 |
| 2,526,983 | Wait | Oct. 24, 1950 |
| 2,535,804 | Marvin | Dec. 26, 1950 |
| 2,646,870 | Parry | July 28, 1953 |
| 2,671,550 | Schultz | Mar. 9, 1954 |
| 2,690,831 | Gersley | Oct. 5, 1954 |

FOREIGN PATENTS

| | | |
|---|---|---|
| 543,180 | Germany | Feb. 1, 1932 |
| 621,369 | Great Britain | Apr. 7, 1949 |